United States Patent
Yamawaki et al.

(10) Patent No.: US 6,710,503 B2
(45) Date of Patent: Mar. 23, 2004

(54) STATOR STRUCTURE FOR CLAW-POLE TYPE STEPPING MOTOR

(75) Inventors: Takayuki Yamawaki, Shizuoka-ken (JP); Hiroshi Sano, Shizuoka-ken (JP); Toshihiko Nagata, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/164,647

(22) Filed: Jun. 5, 2002

(65) Prior Publication Data

US 2002/0190584 A1 Dec. 19, 2002

(30) Foreign Application Priority Data

Jun. 13, 2001 (JP) ......................................... 2001-178896

(51) Int. Cl.⁷ ................................................ H02K 1/12
(52) U.S. Cl. ..................................... 310/257; 310/49 R
(58) Field of Search ................................. 310/257, 258, 310/254, 259, 49 R, 216; 29/596

(56) References Cited

U.S. PATENT DOCUMENTS

| | | | | |
|---|---|---|---|---|
| 4,174,485 A | * | 11/1979 | Soden et al. | ................... 310/89 |
| 4,480,203 A | * | 10/1984 | Takura et al. | .................. 310/42 |
| 4,942,325 A | * | 7/1990 | Fukaya | ........................ 310/257 |
| 4,972,109 A | * | 11/1990 | Kakizaki et al. | ........... 310/49 A |
| 5,648,692 A | * | 7/1997 | Watanabe et al. | ......... 310/49 R |
| 5,945,765 A | * | 8/1999 | Chen | ........................... 310/257 |

FOREIGN PATENT DOCUMENTS

| | | |
|---|---|---|
| GB | 1029974 A | 5/1966 |
| JP | 63031461 A | 2/1988 |
| JP | 09322516 A | 12/1997 |
| JP | 11089207 A | 3/1999 |

* cited by examiner

*Primary Examiner*—Thomas M. Dougherty
*Assistant Examiner*—Leda T. Pham
(74) *Attorney, Agent, or Firm*—Townsend and Townsend and Crew, LLP

(57) ABSTRACT

A stator structure of a claw-pole type stepping motor which has an outer stator yoke having a plurality of pole teeth; an inner stator yoke having a plurality of pole teeth which are intermeshed with the plurality of pole teeth of the outer stator yoke with a gap therebetween; a coil disposed around the circumferential periphery defined by the pole teeth; and a covering which covers the coil. The stator external walls are only partially formed so as to allow the covering to be exposed in regions where the stator external walls are not formed. The stator structure of the present invention enables a dimensional reduction in size of a motor by a dimension corresponding to double the thickness of the stator yoke material, without impairing the performance of the motor.

14 Claims, 3 Drawing Sheets

STATOR STRUCTURE FOR CLAW-POLE TYPE STEPPING MOTOR

BACKGROUND OF THE INVENTION

1. Field of the Invention

The present invention relates generally to a claw-pole type stepping motor, and more particularly to a stator structure of that motor.

2. Description of the Related Art

FIG. 1 is a partly cut-away perspective view of a claw-pole type stepping motor with a conventional stator structure.

Referring to FIG. 1, the claw-pole type stepping motor comprises mainly a stator assembly 9 consisting of a pair of stator subassemblies 8 which are put together back-to-back against each other, and a rotor 11 disposed rotatably inside the stator assembly 9.

A front plate 10a and a rear plate 10b are fitted to the stator assembly 9. A shaft 12 is press fitted into the rotor 11 and rotatably supported by a bearing 13a disposed on the front plate 10a and by another bearing (not shown) disposed on the rear plate 10b.

FIGS. 2A and 2B show the structure of each of the stator subassemblies 8 making up the conventional stator assembly 9, in which FIG. 2A is an exploded view of each of the stator subassembies and FIG. 2B is an assembled view thereof.

As shown in FIG. 2A, the stator subassembly 8 primarily comprises: an outer stator yoke 1 having a plurality of pole teeth 6a which are blanked out and bent by 90° along the circumferential surface of the central portion of the circular sidewall of a cup-shaped or cylindrical member made of a soft magnetic steel plate formed by deep drawing; an inner stator yoke 2 having a plurality of pole teeth 6b which are blanked out and bent by 90° along the circumferential surface of the central portion of substantially circular member made of a soft magnetic steel plate; a coil 3 which is prepared by winding a magnet wire around a bobbin 4; and a covering 5 which covers the coil 3.

The stator subassembly 8 is formed as shown in FIG. 2B by combining the outer stator yoke 1 with the inner stator yoke 2 such that their respective plurality of pole teeth 6a and 6b are intermeshed with each other with a gap therebetween, and are misaligned from each other by an electrical angle of 180°, mounting the coil 3 and the covering 5, and filling the gap between the respective plurality of pole teeth 6a and 6b with resin.

The stator assembly 9 (see FIG. 1) is formed by coupling together two stator subassemblies 8 back-to-back such that the respective plurality of pole teeth 6a and 6b of the two stator subassemblies 8 are misaligned from each other by an electrical angle of 90°.

The conventional stator assembly 9 formed as above poses the following problems.

In the claw-pole type stepping motor having the stator assembly 9, an external wall 7 of the outer stator yoke 1 extends along the overall perimeter. Accordingly, throughout the perimeter of the stator assembly 9, the external dimensions include the dimension corresponding to double the plate thickness of the soft magnetic steel plate, which is the material of the external wall 7, i.e., the material of the outer stator yoke 1. This impedes the size reduction.

Especially, in the event of use in notebook computers needing a reduced thickness, the height is strictly limited as compared with the other dimensions, while higher performances are demanded. This means that even the plate thickness of the outer stator yoke 1 can constitute a serious obstacle.

Furthermore, since the outer periphery of the cup-shaped or cylindrical outer stator yoke is formed by deep drawing, the press working is difficult and the press die is expensive, thereby causing the manufacturing costs to increase.

SUMMARY OF THE INVENTION

The present invention was conceived in view of the above circumstances involved in the related art. It is therefore an object of the present invention to provide a claw-pole type stepping motor capable of achieving a miniaturization and reducing the manufacturing costs, without impairing the motor performances.

In order to attain the above object, according to a primary aspect of the present invention there is provided: a stator structure of a claw-pole type stepping motor having a rotor disposed inside and rotatable relative to the stator, comprising an outer stator yoke having a plurality of pole teeth; an inner stator yoke having a plurality of pole teeth which are intermeshed with the plurality of pole teeth of the outer stator yoke with a gap therebetween; a coil disposed around the circumferential periphery defined by the intermeshed pole teeth; and a covering which covers the coil; wherein stator external walls are partially formed so as to allow the covering to be exposed in regions where the stator external walls are not formed.

The stator structure of a claw-pole type stepping motor according to the primary aspect has the following subsidiary aspects.

The stator external walls are formed by bending extended portions formed at both ends of a main plate portion of the inner stator yoke.

The stator external walls are formed by bending extended portions formed at both ends of a main plate portion of the outer stator yoke.

The stator external walls are formed by bending extended portions formed at both ends of a main plate portion of the inner stator yoke and also by bending extended portions formed at both ends of a main plate portion of the outer stator yoke.

Each of the main plate portions of the outer stator yoke and the inner stator yoke is rectangular in shape.

Each of the main plate portions of the outer stator yoke and the inner stator yoke is ellipsoidal in shape.

In the present invention, as is apparent from the aspects set forth hereinabove, the periphery of the coil i.e. the covering, is partly covered by the external walls extending from the stator yoke so that exposed regions can produce dimensional reduction by the thickness dimension of the stator yoke material. Specifically, the dimensional reduction corresponds to double the thickness of the stator yoke material. On the other hand, the dimensions of the coil, rotor, etc. are not influenced at all, with the result that the motor performances will by no means be sacrificed in exchange for the miniaturization. Thus, this is very effective in satisfying the demand for higher performances as well.

When the same external dimensions are allowed as those of the motor having the conventional stator structure, it will be easier to secure the space for the coil than conventionally, thus making it easier to increase the inner diameter of the circumference defined by the pole teeth and the rotor diameter and, as a result, to provide a higher-torque motor at a reduced cost.

In addition, since the stator yoke member is not cup shaped or cylindrical, there is no need for deep drawing. This makes it possible to pick up the manufacturing work speed, lower the die cost and improve its durability, thus achieving a reduction in the manufacturing cost. In addition, since the stator yoke material is consumed in a reduced amount, the manufacturing cost can be further reduced, and also the natural resources can be saved, which is advantageous in terms of environmental protection.

In this connection, the main plate portion of the outer stator yoke can be rectangular, ellipsoidal or of any other shapes depending on the space to be allowed.

The above and many other objects, aspects, features and advantages of the present invention will become more apparent to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. 2A and 2B illustrate the structure of one of stator subassemblies making up a conventional stator assembly, in which FIG. 2A is an exploded view and FIG. 2B is an assembled view; and FIGS. 3A and 3B illustrate the structure of one of the stator subassemblies making up a stator assembly in accordance with an embodiment of the present invention, in which FIG. 3A is an exploded view and FIG. 3B is an assembled view.

DETAILED DESCRIPTION OF THE PREFERRED EMBODIMENTS

With reference to the accompanying drawings (FIGS. 3A and 3B), description will now be made of preferred embodiments of a stator structure of a claw-pole type stepping motor in accordance with the present invention.

Figure 1:
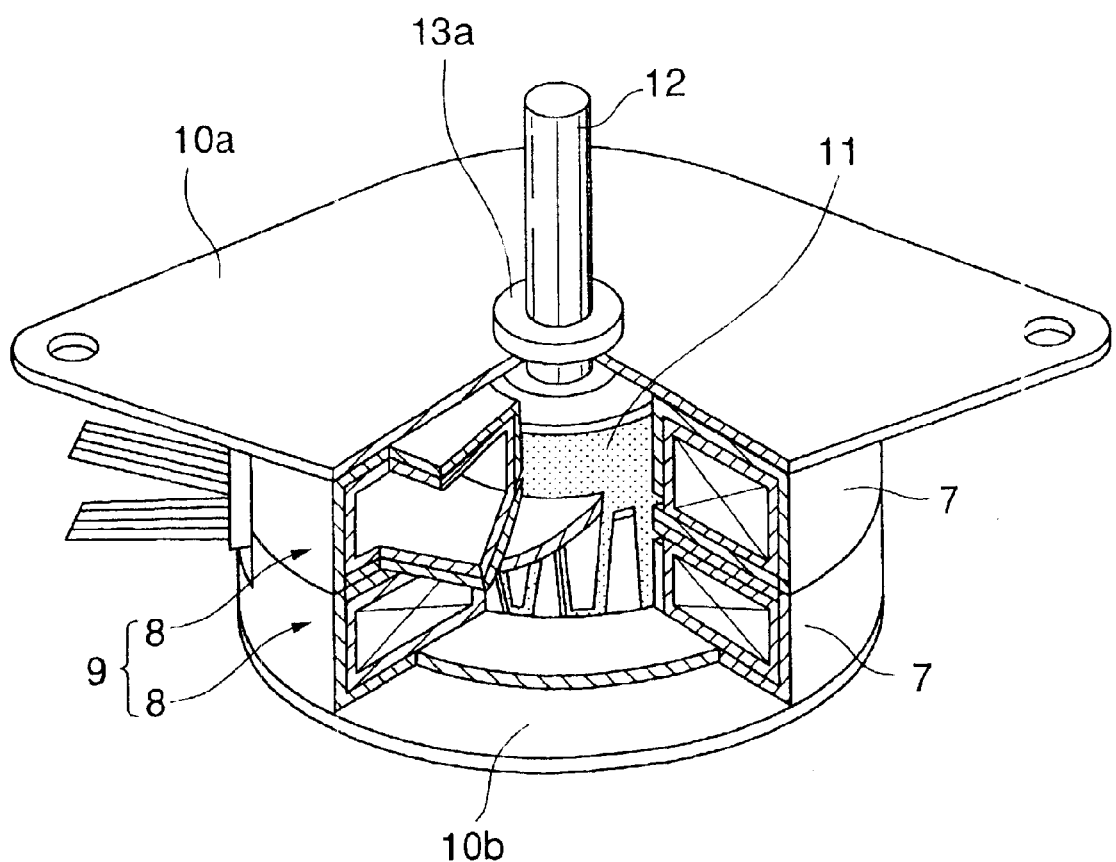
FIG. 1 is a partially cut-away perspective view of a claw-pole type stepping motor with a conventional stator structure.
Figure 2A:
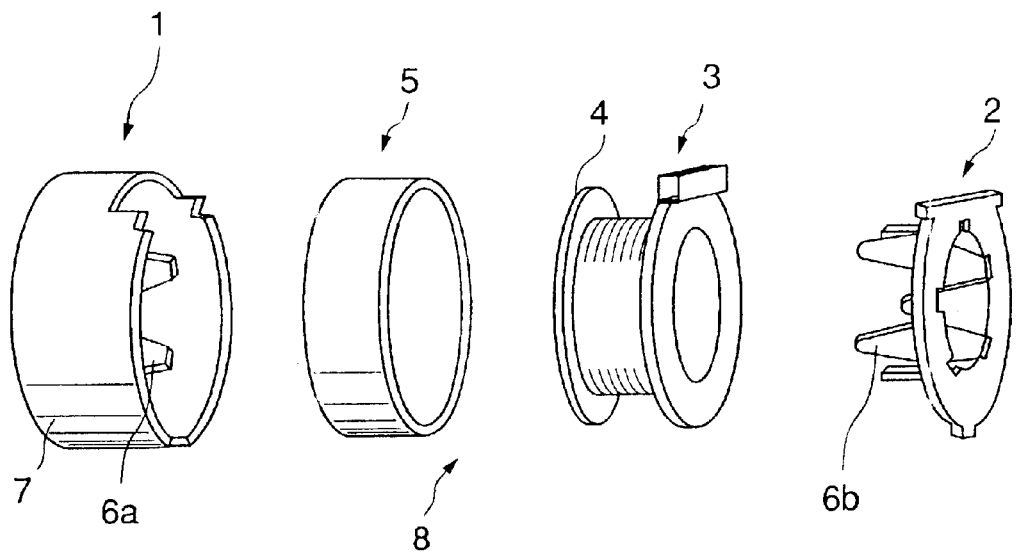
Figure 2B:
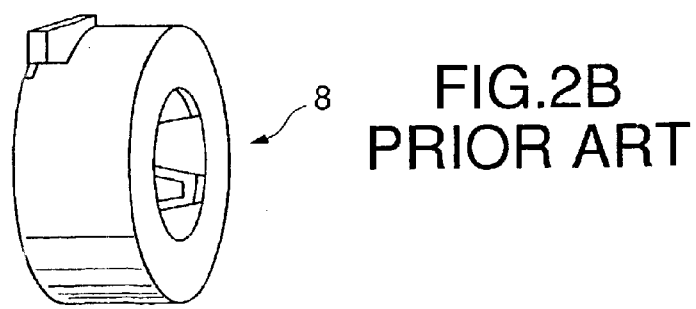
Figure 3A:
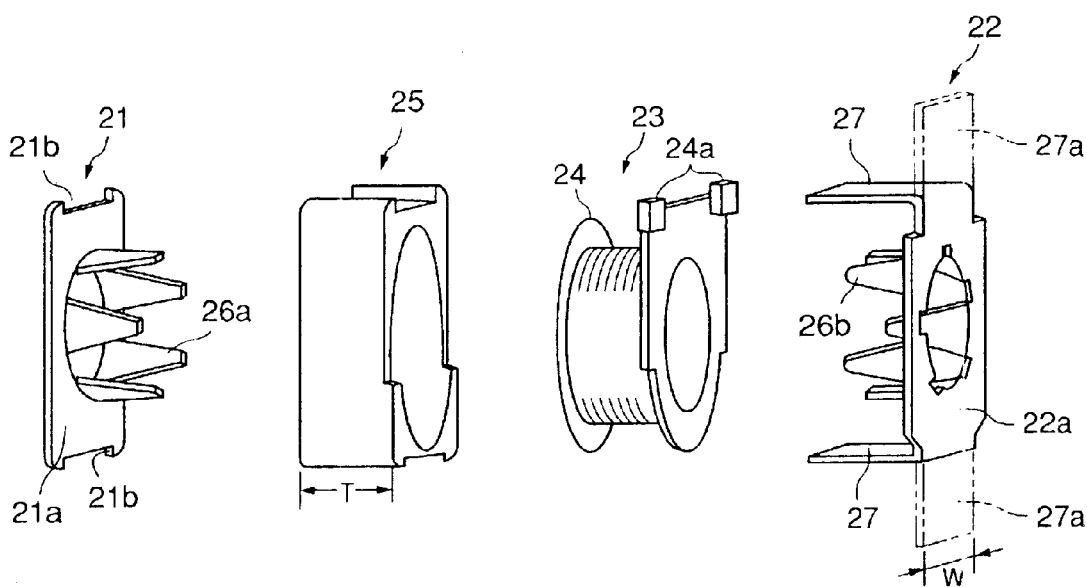
Figure 3B:
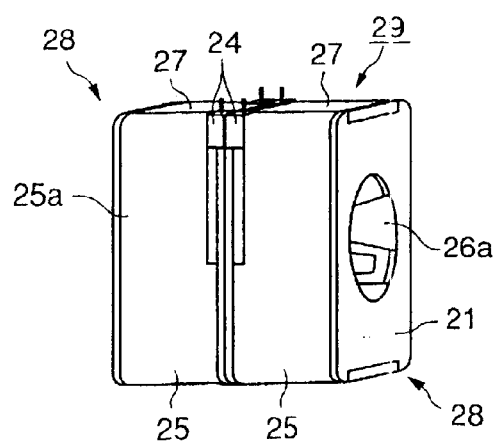

Referring to FIG. 3A, a stator subassembly 28 (see FIG. 3B) comprises principally an outer stator yoke 21, an inner stator yoke 22, a coil 23 prepared by winding a magnet wire around a bobbin 24, and a covering 25. The yokes 21, 22 and the covering 25 are generally rectangular in shape, as is illustrated in FIGS. 3A and 3B.

The outer stator yoke 21 is punched out of a soft magnetic steel plate, and includes a main plate portion 21a shaped substantially rectangular, and a plurality of pole teeth 26a which are circumferentially blanked out of the main plate portion 21a at its center and bent 90° so as to define a substantially cylindrical configuration, with notches 21b being formed at both ends in its longitudinal direction.

Each of the notches 21b has a depth corresponding to the dimension of the plate thickness of the stator yoke material, and a width corresponding to the dimension W in the width direction of each of extended portions 27a (which will be described hereinafter) of the inner stator yoke 22.

The inner stator yoke 22, which has substantially the same structure as the outer stator yoke 21, is punched out of a soft magnetic steel plate, and includes a main plate portion 22a shaped substantially rectangular, and a plurality of pole teeth 26b which are circumferentially blanked out of the main plate portion 22a at its center and bent 90° so as to define a substantially cylindrical configuration, with the aforementioned extended portions 27a being formed at both ends in its longitudinal direction. These extended portions 27a are bent by 90° in the same direction as that of the pole teeth 26a, thereby constituting stator external walls 27.

Each of the stator external walls 27 has a longitudinal dimension equal to the dimension T of the covering 25 plus the plate thickness of the stator yoke material, and also has the lateral dimension W. The lateral dimension W is slightly smaller than the width of the outer stator yoke 21 and of the inner stator yoke 22. The reason for such dimensioning is to facilitate the engagement of each of the stator external walls 27 with the outer stator yoke 21 and also to secure the spaces for exposing terminal blocks 24a of the bobbin 24.

The coil 23 is prepared by winding the magnet wire around the bobbin 24 as described above, and the covering 25 is molded with PBT, etc.

The stator subassembly 28 is formed as follows. The outer stator yoke 21 and the inner stator yoke 22 sandwich the coil 23 and the covering 25 enclosing the coil 23 and are coupled with each other such that their respective plurality of pole teeth 26a and 26b are intermeshed with each other with a gap therebetween and misaligned from each other by an electrical angle of 180°. The stator external walls 27 extend from the inner yoke 22 to the outer stator yoke 21 and engage notches 21b formed at both ends of the outer stator yoke 21 as well as corresponding notches formed on the exterior of covering 25 to thereby couple the yokes and the covering to each other. The stator external walls 27 are constituted by the extend portions 27a formed at both ends of the inner stator yoke 22. Thereafter the gap between the respective plurality of pole teeth 26a and 26b is filled with resin.

To obtain the stator assembly 29, as seen in FIG. 3B, two stator subassemblies 28 are coupled together back-to-back in such a manner that respective inner stator yokes 22 of the two stator subassemblies 28 are attached to each other with the respective plurality of pole teeth 26a and 26b of the two stator subassemblies 28 being misaligned from each other by an electrical angle of 90°.

Two lateral sides 25a of the stator assembly 29 thus formed are provided with no stator yokes, i.e., no stator external walls 27, exposing the covering 25. This enables a dimensional reduction by a dimension corresponding to double the plate thickness of the stator yoke material. The coil is not thoroughly covered by the stator yokes unlike in the conventional stator structure, but is sufficiently protected by the covering 25 against external shock.

The stator external walls 27, which are formed by the extended portions 27a of the inner stator yoke 22 in the above embodiment, may be formed by extended portions of the outer stator yoke 21, and furthermore, may be provided on both the inner stator yoke 22 and the outer stator yoke 21, respectively, so as to overlap with each other, where the stator external walls of the inner stator yoke 22 may be positioned outside, or alternatively the stator external walls of the outer stator yoke 21 may be positioned outside.

The main plate portions 21a and 22a are substantially rectangular in the above embodiment, but may be substantially ellipsoidal. Furthermore, as long as the covering 25 is partially covered, the contour of the main plate portions 21a and 22a is not limited to the substantial rectangle or substantial ellipsoid.

While illustrative and preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A stator structure for a claw-pole type stepping motor having a rotor disposed inside of and rotatable relative to the stator, comprising:

an outer stator yoke having a plurality of pole teeth;

an inner stator yoke having a plurality of pole teeth which are intermeshed with said plurality of pole teeth of said outer stator yoke with a gap therebetween;

a coil disposed around a circumferential periphery defined by said pole teeth;

a covering which covers said coil; and stator external walls extending from one of the inner yoke and outer yoke to the other one of the inner and outer yokes and extending over only a portion of a periphery of the covering so as to allow said covering to be exposed in regions where said stator external walls are not present.

2. A stator structure according to claim 1, wherein said stator external walls are formed by bending extended portions formed at both ends of a main plate portion of said inner stator yoke.

3. A stator structure according to claim 1, wherein said stator external walls are formed by bending extended portions formed at both ends of a main plate portion of said outer stator yoke.

4. A stator structure according to claim 1, wherein said stator external walls are formed by bending extended portions formed at both ends of a main plate portion of said inner stator yoke and extended portions formed at both ends of a main plate portion of said outer stator yoke.

5. A stator structure according to claim 1, wherein each main plate portion of said outer stator yoke and said inner stator yoke is rectangular in shape.

6. A stator structure according to claim 1, wherein each main plate portion of said outer stator yoke and said inner stator yoke is ellipsoidal in shape.

7. A stator for a claw-type stepping motor having a rotor disposed inside of and rotatable relative to the stator, the stator comprising an outer stator yoke and an inner stator yoke, each having a plurality of pole teeth which are intermeshed with pole teeth of the other so as to form a gap between them, a coil arranged about the pole teeth radially outward thereof, a covering surrounding the coil and extending from the outer stator yoke to the inner stator yoke, the inner and outer stator yokes and the covering having a common, substantially rectangular shape, and an external stator wall arranged to keep the rectangular shapes of the stator yokes and the covering in mutual alignment and leaving portions of the yokes and the covering exposed.

8. A stator according to claim 7 comprising first and second external stator walls arranged at opposing sides of the rectangular shape of the stator yokes and the covering.

9. A stator according to claim 7 comprising first and second external stator walls spaced apart by 180°.

10. A stator according to claim 7 wherein the external stator walls are connected to one of the yokes.

11. A stator according to claim 10 wherein the external stator walls are attached to the inner yoke.

12. A stator according to claim 11 wherein the external stator wall is uniformly constructed with the inner yoke and is at an angle of substantially 90° with respect to the inner yoke.

13. A stator according to claim 12 wherein the stator external wall has an exterior surface which is substantially flush with corresponding peripheries of the covering and the outer yoke.

14. A stator according to claim 13 wherein the outer yoke and the covering include grooves formed to receive the external stator wall and having a depth so that an exterior surface of the stator wall does not project past corresponding peripheries of the outer yoke and the covering.

* * * * *